(12) United States Patent
Nishi et al.

(10) Patent No.: US 6,708,963 B2
(45) Date of Patent: Mar. 23, 2004

(54) FLUID-FILLED VIBRATION-DAMPING DEVICE AND METHOD OF CONTROLLING THE SAME

(75) Inventors: Naoki Nishi, Nagoya (JP); Kazuhiko Kato, Komaki (JP); Hideki Matsuoka, Wako (JP)

(73) Assignee: Tokai Rubber Industries, Ltd., Komaki (JP)

( * ) Notice: Subject to any disclaimer, the term of this patent is extended or adjusted under 35 U.S.C. 154(b) by 31 days.

(21) Appl. No.: 10/194,616

(22) Filed: Jul. 11, 2002

(65) Prior Publication Data

US 2003/0011117 A1 Jan. 16, 2003

(30) Foreign Application Priority Data

Jul. 16, 2001 (JP) ........................... 2001-215662
Oct. 18, 2001 (JP) ........................... 2001-320692

(51) Int. Cl.⁷ .............................................. F16F 13/00
(52) U.S. Cl. ................................ 267/140.14; 267/140.15
(58) Field of Search ..................... 267/140.14, 140.15, 267/140.13

(56) References Cited

U.S. PATENT DOCUMENTS

| 5,642,873 | A |   | 7/1997  | Kato            |            |
|-----------|---|---|---------|-----------------|------------|
| 5,947,456 | A | * | 9/1999  | Aoki            | 267/140.14 |
| 6,017,024 | A |   | 1/2000  | Muramatsu et al.|            |
| 6,062,550 | A | * | 5/2000  | Aoki            | 267/140.13 |
| 6,186,485 | B1| * | 2/2001  | Kawazoe         | 267/140.14 |
| 6,199,842 | B1| * | 3/2001  | Gennesseaux et al.| 267/140.13 |
| 6,422,545 | B1| * | 7/2002  | Baudendistel et al.| 267/140.13 |
| 6,439,554 | B1| * | 8/2002  | Takashima et al.| 267/140.13 |
| 6,523,816 | B1| * | 2/2003  | Gastineau et al.| 267/140.14 |
| 6,527,260 | B2| * | 3/2003  | Takeo et al.    | 267/140.14 |
| 6,601,835 | B2| * | 8/2003  | Genesseaux      | 267/140.13 |
| 2001/0030390| A1| * | 10/2001| Vermaerke et al.| 267/140.15 |

FOREIGN PATENT DOCUMENTS

| JP | 8-270718  | 10/1996 |
| JP | 10-184770 | 7/1998  |

* cited by examiner

*Primary Examiner*—Robert A. Siconolfi
(74) *Attorney, Agent, or Firm*—Beyer Weaver & Thomas, LLP

(57) ABSTRACT

A vibration-damping device including: an elastic body connecting a first and a second mounting member: a pressure receiving and equilibrium chambers partially defined by the elastic body and a flexible diaphragm, filled with a non-compressible fluid and held in fluid communication through a first orifice passage and a second orifice passage that is tuned higher than the first orifice passage. A shut-off valve mechanism operable to selectively allow and inhibit fluid flows through the second orifice passage, an elastic oscillation plate partially defining the pressure-receiving chamber so that a fluid pressure in the pressure-receiving chamber acts on one surface of the elastic oscillation plate, and a working air chamber partially defined by the other surface of the elastic oscillation plate and oscillated by a periodic air pressure change in the working air chamber, are also incorporated. A method of controlling the same is also disclosed.

14 Claims, 5 Drawing Sheets

FLUID-FILLED VIBRATION-DAMPING DEVICE AND METHOD OF CONTROLLING THE SAME

INCORPORATED BY REFERENCE

The disclosure of Japanese Patent Application No. 2001-215662 filed on Jul. 16, 2001 and No. 2001-320692 filed on Oct. 18, 2001, each including the specification, drawings and abstract is incorporated herein by reference in its entirety.

BACKGROUND OF THE INVENTION

1. Field of the Invention

The present invention relates generally to fluid-filled vibration-damping devices exhibiting vibration-damping effect on the basis of flows of non-compressible fluid filled therein, and a method of controlling these devices. More particularly, the present invention is concerned with such a fluid-filled vibration-damping device that is suitably applicable to an engine mount, a body mount or the like for use in an automotive vehicle, and a method of controlling the same.

2. Description of the Related Art

A fluid-filled vibration-damping device is known as one type of a vibration-damping device interposed between two members of a vibration system for elastically connecting the two members, or for mounting one of the two members of the vibration system on the other member in a vibration-damping fashion. The known fluid-filled vibration-damping device includes: a first mounting member adapted to be attached to one of the two members of the vibration system; a second mounting member adapted to be attached to the other member of the vibration system; a rubber elastic body elastically connecting the first and second mounting members; a pressure-receiving chamber partially defined by the rubber elastic body and filled with a non-compressible fluid; an equilibrium chamber partially defined by a flexible layer and filled with the non-compressible fluid; and an orifice passage permitting a fluid communication between the pressure-receiving chamber and the equilibrium chamber. The known fluid-filled vibration-damping device is capable of exhibiting a desired vibration-damping effect on the basis of flows of the fluid through the orifice passage, and is favorably used as an engine mount or other damping members for use in an automotive vehicle.

Generally, a fluid-filled vibration-damping device when used as a vehicle engine mount is required to exhibit different damping characteristics depending on the type of the input vibrations having different frequencies and amplitudes. However, the range of frequency of the input vibrations that can be effectively damped by fluid flows through an orifice passage is relatively narrow. Therefore, a fluid-filled vibration-damping device using a single orifice passage is generally incapable of exhibiting desired damping characteristics to a satisfactory extent.

In view of the above problem, there has been proposed a mount structure comprising a plurality of orifice passages each permitting a fluid communication between the pressure-receiving chamber and the equilibrium chamber, and being tuned to a plurality of frequency ranges to be damped or isolated, respectively. Based on the resonance of the fluid flowing through the plurality of orifice passages, this mount structure can exhibit a vibration-damping effect with respect to the input vibrations over a wide or a plurality of different frequency bands to which the plurality of orifice passages are respectively tuned.

However, in the mount structure constructed as described above, a resistance to flow of the fluid through the orifice passage tuned to a low frequency range is made higher than that of the orifice passage tuned to a high frequency range. Accordingly, the fluid is prone to flow through the orifice passage tuned to the high frequency range, rather than the orifice passage tuned to the low frequency range, resulting in insufficient damping effect based on the flows of the fluid through the orifice passage tuned to the low frequency range.

JP-A-8-270718 discloses an example of another type of the fluid-filled vibration-damping device, which has been proposed to cope with the above-described problem. The disclosed damping device includes an orifice closing member adapted to bring the orifice passage tuned to the high frequency range into an operable state or an inoperable state, thus being capable of selectively effecting the orifice passage tuned to the low frequency range and the orifice passage tuned to the high frequency range.

In the case where the fluid-filled vibration-damping device uses three or more orifice passage, two or more orifice closing members need to be disposed within the device, leading to a complicated structure and a sophisticated manner of control of the operation of the device. Thus, the conventional fluid-filled vibration-damping device suffers from difficulty in exhibiting excellent damping effect with respect to input vibrations over three or more different frequencies.

If all of the plurality of orifice passages tuned to different frequency ranges are held in their operable states simultaneously, then the orifice passage, which is tuned to the lowermost frequency range, and accordingly has a high resistance to flow of the fluid therethrough, inevitably suffers from lack of an amount of flow of the fluid therethrough. For the above reasons, it is significantly difficult to achieve different damping effect with respect to input vibrations having different frequencies, simultaneously, even in the fluid-filled vibration-damping device equipped with the plurality of orifice passages and the orifice closing members.

SUMMARY OF THE INVENTION

It is therefore one object of this invention to provide a fluid-filled vibration-damping device that is novel and simple in construction and that is capable of exhibiting an excellent vibration-damping effect input vibrations over a plurality of frequencies or a wide range of frequency of the input vibrations.

It is another object of the invention to provide a method of controlling operation of the fluid-filled vibration-damping device of the invention.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration-damping device for connecting two members in a vibration-damping fashion, that includes:

(a) a first mounting member and a second mounting member disposed in a mutually spaced-apart relationship with each other and adapted to be attached to the two members, respectively; (b) an elastic body elastically connecting the first and second mounting members, and partially defining (c) a pressure-receiving chamber filled with a non-compressible fluid whose pressure varies upon application of a vibrational load to the pressure-receiving chamber; (d) a flexible diaphragm partially defining an equilibrium chamber filled with the non-compressible fluid and whose volume is variable; (e) a first orifice passage for fluid communication between the pressure-receiving chamber and the equilibrium chamber; (f) a second orifice passage for fluid communication between the pressure-receiving chamber and the equilibrium chamber, the second orifice passage being tuned to a frequency range that is higher than a frequency range to which the first orifice passage is tuned; (g) a shut-off valve mechanism operable to selectively bring the second orifice passage to an operable state and an inoperable state, while permitting a fluid communication through the first orifice passage; (h) an elastic oscillation plate partially defining the pressure-receiving chamber so that a fluid pressure in the pressure-receiving chamber acts on one of opposite surfaces of the elastic oscillation plate; and (i) a working air chamber partially defined by an other one of opposite surfaces of the elastic oscillation plate, which is remote from the pressure-receiving chamber, the elastic oscillation plate being oscillated by a periodic change of an air pressure in the working air chamber.

The fluid-filled vibration-damping device according to this mode of the invention can exhibit an intended vibration-damping effect with respect to low frequency vibrations on the basis of flows of the fluid through the first orifice passage with the second orifice passage being inoperative by means of the shut-off valve mechanism, and can exhibit an intended desired vibration isolation effect with respect to higher frequency vibrations on the basis of flows of the fluid through the second orifice passage with the second orifice passage being operative by means of the shut-off valve mechanism. In addition, the fluid-filled vibration-damping device of this mode is capable of exhibiting active damping effect by oscillating the elastic oscillating plate with the help of periodic air pressure change induced in the working air chamber, also, making it possible to improve vibration-damping or isolating effect on the basis of the fluid flowing through the first or second orifice passage at the frequency to which the first or second orifice passage is tuned, or alternatively to exhibit a vibration-damping or isolating effect at a frequency that is different from the frequency ranges to which the first and second orifice passages are tuned.

In the fluid-filled vibration-damping device of this mode of the invention, the second orifice passage is selectively controlled to be operative or inoperative for permitting or inhibiting the fluid communication therethrough, allowing the vibration-damping device to selectively exhibit passive damping effect with the help of fluid flows through the first and second orifice passages. In addition, the fluid-filled vibration-damping device of this mode of the invention is capable of exhibiting the active damping effect at a suitable opportunity by oscillating the elastic oscillation plate. That is, the present vibration-damping device can utilize both of passive and active damping effect, making it possible to selectively exhibit appropriate damping effect at three or more different frequency ranges of vibrations to be damped, or alternatively to simultaneously exhibit excellent vibration-damping effect with respect to vibrations having different frequencies.

(2) A fluid-filled vibration-damping device according to the above-indicated mode (1), wherein one of opposite openings of the second orifice passage for fluid communication with the equilibrium chamber is located in a position that is different from a position where one of opposite openings of the first orifice passage for fluid communication with the equilibrium chamber is located, the vibration-damping device further comprising a pneumatically operated actuator disposed to be opposed to the one of opposite openings of the second orifice passage with the flexible diaphragm interposed therebetween, the pneumatically operated actuator being operable to displace the flexible diaphragm to selectively be pressed onto and retracted from the one of opposite openings of the second orifice passage, in order to selectively bring the second orifice passage to the operable state and the inoperable state. According to this mode of the invention the shut-off valve mechanism can be embodied by utilizing the pneumatically operated actuator that is simple in construction and light in weight. In this respect, air pressure to be applied to the working air chamber can also be utilized to operate the pneumatically operated actuator, making it possible to further simplify the structure of the fluid-filled vibration-damping device of this mode of the invention.

(3) A fluid-filled vibration-damping device according the above-indicated modes (1) or (2), wherein the pressure-receiving chamber is divided into a primary fluid chamber partially defined by the elastic body and an auxiliary fluid chamber partially defined by the elastic oscillation plate, the vibration-damping device further comprising a third orifice passage for fluid communication between the primary fluid chamber and the auxiliary fluid chamber, which is tuned to a frequency range higher than the frequency range to which the second orifice passage is tuned. In the fluid-filled vibration-damping device constructed according to this mode of the invention, a fluid pressure variation induced in the auxiliary fluid chamber by the oscillation of the elastic oscillation member can be effectively transmitted to the primary fluid chamber through the third orifice passage, by suitably tuning the third orifice passage, thus improving pressure transmitting efficiency. Alternatively, the third orifice passage is capable of restricting or preventing that higher frequency components contained in the fluid pressure variation are undesirably transmitted from the auxiliary fluid chamber to the primary fluid chamber.

In order to restrict or prevent undesirable transmission of the higher frequency components contained in the fluid pressure variation caused in the auxiliary fluid chamber by the oscillation of the elastic oscillation member to the primary fluid chamber, the third orifice passage is desirably tuned to a frequency range that is generally equal to or slightly higher than a highest value of a frequency range of the active damping effect as a result of oscillation of the elastic oscillation plate. Further, at around tuning frequency of the third orifice passage, the fluid pressure variation induced in the auxiliary fluid chamber can be transmitted to the primary fluid chamber with an improved efficiency with the help of resonance or flows of the fluid through the third orifice passage.

(4) A fluid-filled vibration-damping device according to any one of the above-indicated modes (1)–(3), wherein the vibration-damping device is applied to an engine mount for use in an automotive vehicle, and the first, second and third orifice passages are respectively tuned to a low frequency range corresponding to engine shakes, an intermediate frequency range corresponding to engine idling vibrations, and a high frequency vibrations corresponding to booming noises that are produced during running of the vehicle. This arrangement allows the fluid-filled vibration-damping device to be provided as an engine mount that exhibits excellent damping effect with respect to vibrations to be damped in the automotive vehicle.

(5) A fluid-filled vibration-damping device according to any one of the above-indicated modes (1)–(4), wherein the second mounting member includes a cylindrical portion and one of axially opposite opening of the cylindrical portion is opposed to the first mounting member with a spacing therebetween, and the elastic body elastically connecting the first and second mounting members fluid-tightly closes the one of axially opposite opening of the cylindrical portion of the second mounting member, while the flexible diaphragm fluid-tightly closes an other one of axially opposite opening of the cylindrical portion of the second mounting member, wherein the vibration-damping device further comprises a partition member supported by the cylindrical portion of the second mounting member and being disposed between the elastic body and the flexible diaphragm so that the pressure-receiving chamber and the equilibrium chamber is disposed on the opposite sides of the partition member, and wherein the first orifice passage is formed in an outer circumferential portion of the partition member so as to extend circumferentially, and the second orifice passage is formed in a central portion of the partition member, while the elastic oscillation plate is disposed in and supported by a portion of the partition member where the first and second orifice passages are not disposed, such that the portion of the partition member cooperates with the other one of opposite surfaces of the elastic oscillation plate to form the working air chamber. In this arrangement, the partition member, which separates the pressure-receiving chamber and the equilibrium chamber from each other, is efficiently utilized to form the first and second orifice passages, the working air chambers and the like within the cylindrical portion of the second mounting member with effective space utilization, permitting the vibration-damping device to be compact in its entire size.

(6) A fluid-filled vibration-damping device according to any one of the above-indicated modes (1)–(5), wherein the shut-off valve mechanism comprises a pneumatically operated shut-off valve that is operable to bring the second orifice passage to the inoperable state by an atmospheric pressure applied thereto and to the operable state by a negative pressure applied thereto, the vibration-damping device further comprising: a first pressure control valve having an active-side port for communication with the working air chamber, an atmosphere-side port for communication with the atmosphere and a vacuum-side port for communication with a vacuum source, and being operable to alternately connect the active-side port to the atmosphere-side port and the vacuum-side port for alternately applying an atmospheric pressure and a negative pressure to the working air chamber, in order to control oscillation of the elastic oscillation plate based on a periodic air pressure change induced in the working air chamber; and a second pressure control valve having an active-side port for communication with the pneumatically operated shut-off valve, an atmosphere-side port for communication with the atmosphere and a vacuum-side port for communication with a vacuum source, and being operable to alternately connect the active-side port to the atmosphere-side port and the vacuum-side port for alternately applying the atmospheric pressure and the negative pressure to the pneumatically operated shut-off valve, in order to selectively bring the second orifice passage to the operable state and the inoperable state, wherein the atmosphere-side port of the first pressure control valve is connected to the active-side port of the second pressure control valve so that the atmospheric pressure is applied to the atmosphere-side port of the first pressure control valve through the second pressure control valve. In a state where the second pressure control valve is held in a position for permitting a connection between the active-side port and the vacuum-side port, while the first pressure control valve is held in a position for permitting a connection between the active-side port and the atmosphere-side port, for example, the second orifice passage is held in its operable state for permitting fluid flows therethrough, while the elastic oscillation plate is held in a state of vacuum suction due to the negative pressure applied to the working air chamber, thus allowing the elastic oscillation plate to acquire stiffer spring characteristics.

That is, the fluid-filled vibration-damping device constructed according to the mode (6) of the invention is capable of restricting or prohibiting the elastic deformation or displacement of the elastic oscillation plate that functions to absorb the pressure variation induced in the pressure-receiving chamber. This arrangement is effective to obtain a sufficient amount of fluid flows through the second orifice passage, assuring an improved passive damping effect on the basis of fluid flows through the second orifice passage.

(7) A method of controlling a fluid-filled vibration-damping device as defined in the above-indicated mode (4) or (6), comprising the steps of: when the vehicle is idling, bringing the second orifice passage to the operable state; when the vehicle is running, bringing the second orifice passage to the inoperable state by means of the shut-off valve mechanism; and at least when the vehicle is running, applying to the working air chamber a periodic air pressure change at a frequency corresponding to that of vibrations to be damped in order to oscillate the elastic oscillation plate. According to the control method of this mode, the fluid-filled vibration-damping device as defined in the above indicated mode (4) or (6) can exhibit excellent damping effect with respect to low frequency vibrations such as engine shakes excited in the running condition of the vehicle, and intermediate frequency vibrations such as engine idling vibrations excited in the idling condition of the vehicle, by selectively utilizing the fluid flows through the first orifice passage and the fluid flows through the second orifice passage depending upon driving conditions of the vehicle. In the running condition of the vehicle, moreover, the fluid-filled vibration-damping device can exhibit active damping effect on the basis of the oscillation of the elastic oscillation plate with respect to intermediate or high frequency vibrations, as well as the passive damping effect with respect to low frequency vibrations on the basis of fluid flows through the first orifice passage. Therefore, the fluid-filled vibration-damping device as defined in the mode (4) or (6), which is operated according to the control method of the mode (7), is able to exhibit excellent damping effect over a wide range of frequency or a plurality of frequencies of the input vibrations. It is noted that the term "the vehicle is idling" should be interpreted to mean the driving state of the vehicle where the engine is idling with the vehicle stopped.

(8) A method of controlling a fluid-filled vibration-damping device according to the above-indicated mode (7), further comprising the steps of: when the vehicle is idling, bringing the second orifice passage to the operable state while applying to the working air chamber a periodic air pressure change at a frequency corresponding to that of the engine idling vibrations in order to oscillate the elastic oscillation plate; and when the vehicle is running, bringing the second orifice passage to the inoperable state by means of the shut-off valve mechanism, while applying to the working air chamber a periodic air pressure change at a frequency corresponding to that of the booming noises in order to oscillate the elastic oscillation plate. According to the control method of this mode, the fluid-filled vibration-damping device can exhibit excellent damping effect with respect to idling vibrations by utilizing a passive damping effect on the basis of fluid flows through the second orifice passage as well as an active damping effect on the basis of the oscillation of the elastic oscillation plate, when the vehicle is idling. When the vehicle is running, on the other hand, the fluid-filled vibration-damping device can exhibit excellent damping effect with respect to low frequency vibrations such as engine shakes and intermediate and high frequency vibrations such as booming noises, by utilizing a passive damping effect on the basis of the fluid flows through the first orifice passage and the active damping effect on the basis of oscillation of the elastic oscillation plate. Thus, the present control method allows the fluid-filled vibration-damping device to exhibit desired vibration-damping effect over a wide range of frequency or a plurality of frequencies of the input vibrations desired to be damped in the vehicle.

(9) A method of controlling a fluid-filled vibration-damping device according to the above-indicated mode (7), further comprising the steps of: when the vehicle is idling, bringing the second orifice passage to the operable state and applying a negative pressure to the working air chamber; and when the vehicle is running, bringing the second orifice passage to the inoperable state by means of the shut-off valve mechanism, while applying to the working air chamber a periodic air pressure change at a frequency corresponding to that of vibrations to be damped in order to oscillate the elastic oscillation plate. According to the control method of this mode, when the vehicle is idling, the negative pressure is applied to the working air chamber to hold the elastic oscillating plate in a state of vacuum suction, thereby providing stiffer spring characteristics of the elastic oscillating plate. This arrangement makes it possible to restrict or prevent absorption of the internal pressure changes in the pressure-receiving chamber based on the elastic deformation or elastic displacement of the oscillation rubber plate, thus assuring a sufficient amount of flows of the fluid through the second orifice passage, resulting in an intended passive vibration damping effect with respect to the engine idling vibrations. When the vehicle is running on the other hand, the fluid-filled vibration-damping device can exhibit excellent damping effect with respect to low frequency vibrations such as engine shakes and intermediate and high frequency vibrations such as booming noises, by utilizing a passive damping effect on the basis of the fluid flows through the first orifice passage and the active damping effect on the basis of oscillation of the elastic oscillation plate. Thus, the present control method allows the fluid-filled vibration-damping device to exhibit desired vibration-damping effect over a wide range of frequency or a plurality of frequencies of the input vibrations desired to be damped in the vehicle.

Preferably, the control method according to this mode (9) of the invention is desirably applied to control the fluid-filled vibration-damping device constructed according to the above-described mode (6). This makes it easy to control the second orifice passage to selectively be operative and inoperative, and to control air pressure in the working air chamber.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
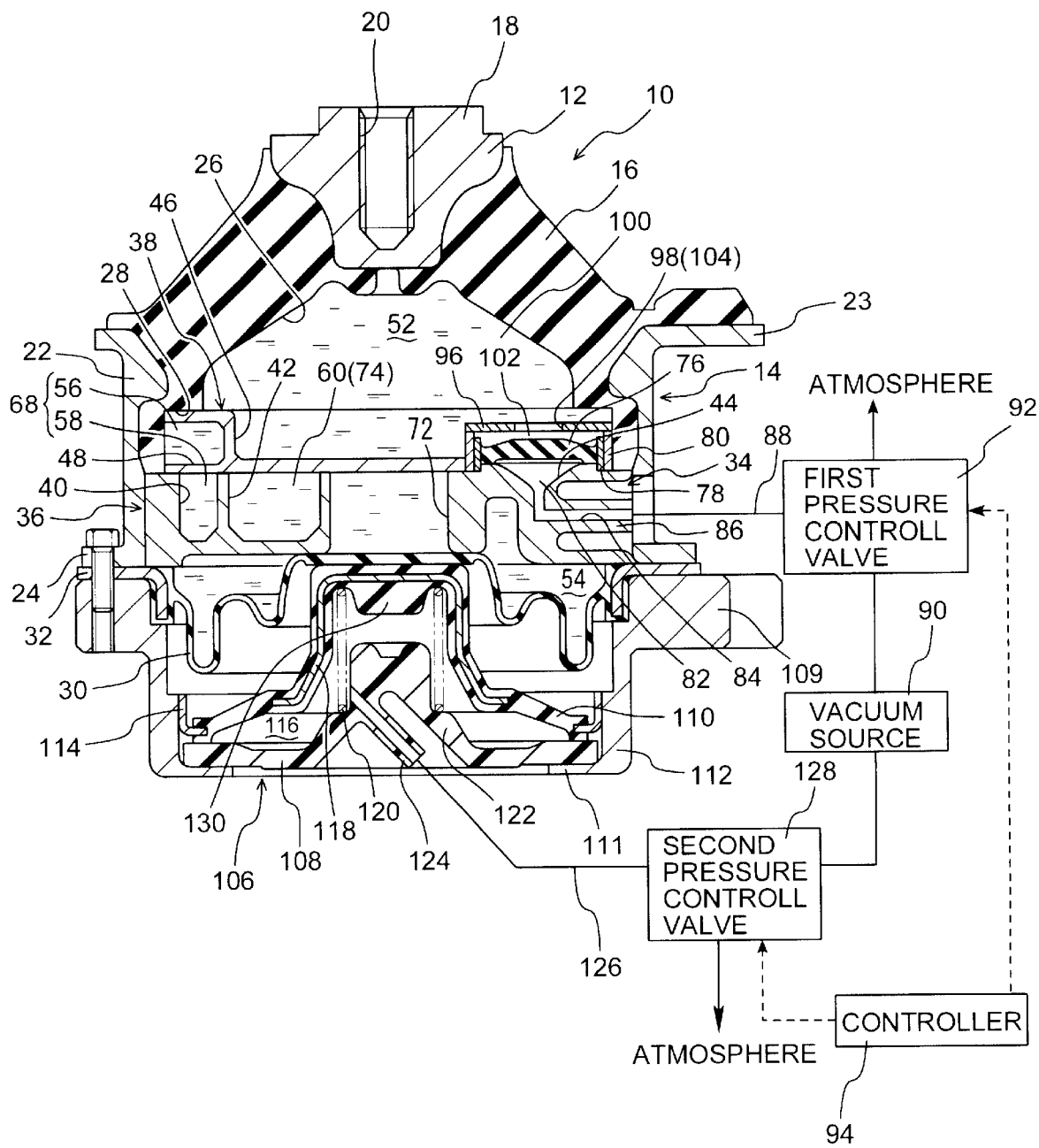
FIG. 1 is an elevational view in axial or vertical cross section of a fluid-filled vibration-damping device in the form of an engine mount constructed according to a first embodiment of the invention.

Referring first to FIG. 1, an engine mount 10 for use in an automotive vehicle is shown as a first embodiment of a fluid-filled vibration-damping device constructed according to the present invention. This engine mount 10 includes an elastic body 16 that elastically connects a first and a second mounting member 12, 14 that are disposed in mutually spaced-apart relationship with each other. The first mounting member 12 is attached to a member on the side of a power unit, while the second mounting member 14 is attached to a member on the side of a body of the vehicle, whereby the power unit of the vehicle is elastically mounted on the body in a vibration-damping fashion via the engine mount 10. In the following description, the vertical direction is basically oriented in the vertical direction as seen in FIG. 1.

More specifically, the first mounting member 12 has an inverted truncated conical shape in its entirety, and a positioning protrusion 18 that extends axially outside is integrally formed in the central portion of a large-diameter end-face. The first mounting member 12 also has a tapped hole 20 that makes an opening in the protruding end-face of the positioning protrusion 18 and extends in the axial direction. The first mounting member 12 can be mounted on the power unit by means of a bolt (not shown) screwed into the tapped hole 20.

The second mounting member 14 has a large-diameter cylindrical shape in its entirety, and upper and lower flange portions 23, 24, which protrude radially outward in an annular discoid shape, are integrally formed in the upper and lower axial end portions of a cylindrical portion 22. The first mounting member 12 is disposed opposite to the upper open end of the second mounting member 14 with a spacing therebetween, and the first and the second mounting members 12, 14 are elastically coupled by the elastic body 16 made of rubber.

This elastic body 16 has a truncated conical shape in its entirety, and has a large-diameter recess 26 open in its large-diameter end face. The elastic body 16 is bonded at its small diameter end portion to the first mounting member 12 partially embedded therein in the process of vulcanization of a rubber material for forming the elastic body 16. The elastic body 16 is also bonded at an outer circumferential surface of its large diameter end portion to an upper-side inner circumferential surface of the second mounting member 14, in the same vulcanization process, whereby the upper open end of the second mounting member 14 is sealed fluid-tightly by the elastic body 16. An annular shoulder surface 28 is formed in a portion on the inner circumferential surface of the recess and close to the open-end portion of the recess 26.

A diaphragm 30 functioning as a flexible diaphragm is positioned underneath the second mounting member 14. This diaphragm 30 consists of a thin rubber film and has a substantially thin disc shape possessing a rippled slack. A support attachment 32 having a substantially annular discoid shape is disposed around the diaphragm 30, and the peripheral portion of the diaphragm 30 is bonded to an inner circumferential surface of the support attachment 32 in the process of vulcanization of a rubber material for forming the diaphragm 30. The diaphragm 30 is secured to the second mounting member 14 such that the support attachment 32 is superposed on and bolted to the lower end face of the lower flange portion 24 of the second mounting member 14. With the diaphragm 30 being secured to the second mounting member 14 in this way, the lower open end of the cylindrical portion 22 of the second mounting member 14 is fluid-tightly closed by the diaphragm 30, whereby a sealed area that is shut-off from the outside space is formed between the opposing faces of the elastic body 16 and the diaphragm 30.

Figure 2:
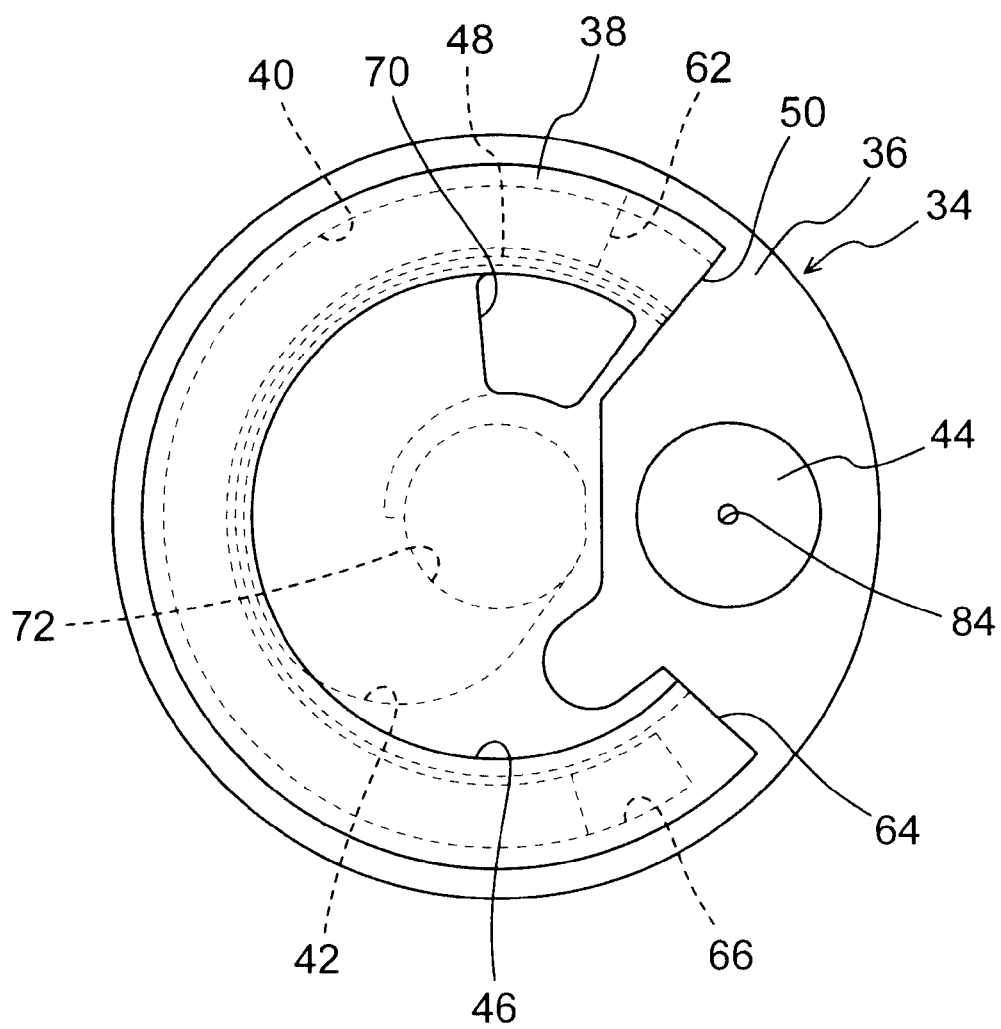
FIG. 2 is a top plane view of a partition member of the engine mount of FIG. 1.

A partition member 34 is also housed within the sealed area formed between the opposing faces of the elastic body 16 and the diaphragm 30. This partition member 34, as shown in FIG. 2, includes a partition body member 36 and a covering member 38, which are both formed of hard materials such as metallic materials or hard synthetic resins. This partition body member 36 has a thick discoid shape, and the outer peripheral edge thereof is provided with a circumferential groove 40 that opens in its upper surface and extends across a given circumferential length in a circumferential direction with a substantially constant cross-sectional shape. The central portion of the partition body member 36 is provided with a generally spiral groove 42 extending across a given circumferential length along the internal radial side of the circumferential groove 40, while having a substantially constant cross-sectional shape. Still further, the partition body member 36 is provided with a recess 44 that opens in a portion of the upper surface in which the circumferential groove 40 and the spiral groove 42 are not formed.

The covering member 38 has a thick discoid shape in its entirety, and has a central recess 46 that extends in the axial direction with a substantially constant circular cross section, and is open in its upper surface. The covering member 38 is further formed in its peripheral portion with an outer circumferential groove 48 that is open in its outer circumferential surface and extends across a given circumferential length in a circumferential direction with a substantially fixed cross-sectional shape. A notch portion 50 is formed in the portion wherein the outer circumferential groove 48 is not formed so as to extend circumferentially over the length of one quarter of a circumference of the covering member 38.

The partition member 34 is attached to the second mounting member 14 by inserting the second mounting member 14 with the partition body member 36 and the covering member 38 being concentrically superposed on each other. The recess 44 formed in the partition body member 36 is aligned with the notch portion 50 formed in the covering member 38, and the recess 44 is open at the top through the notch portion 50 in a state where the partition member 34 is attached to the second mounting member 14. The partition member 34 is secured to the second mounting member 14 such that the partition member 34 is held by and between the elastic body 16 and the support attachment 32 in the axial direction.

A pressure-receiving chamber 52 and an equilibrium chamber 54 are formed on the above and under the partition member 34 in the axial direction. The pressure-receiving chamber 52 is partially defined by the elastic body 16 and is filled with a non-compressible fluid whose pressure varies due to the elastic deformation of the elastic body 16 upon application of a vibrational load to the pressure-receiving chamber. The equilibrium chamber 54 is partially defined by the flexible diaphragm 30 and is filled with the non-compressible fluid, also. A volume of the equilibrium chamber 54 is permitted to vary by displacement of the diaphragm 30, for thereby absorbing a fluctuation of the pressure of the fluid in the pressure-receiving chamber. The non-compressible fluid may be water, alkylene glycol, polyalkylene glycol, silicone oil, or the like. To assure an excellent vibration-damping effect of the engine mount 10 based on a flow of the non-compressible fluid, the non-compressible fluid desirably has a viscosity not higher than 0.1 Pa·s.

The covering member 38 is press-fitted into the recess 26 of the elastic body 16. In this state, the opening of the outer circumferential groove 48 is fluid-tightly closed by the inner circumferential surface of the recess 26, while the openings of the circumferential groove 40 and the spiral groove 42 provided in the partition body member 36 are fluid-tightly closed by the covering member 38. Thus, an upper channel 56 that extends circumferentially with a substantially constant cross-sectional shape is formed in the outer peripheral edge of the covering member 38, and a lower channel 58 that extends circumferentially with a substantially constant cross-sectional shape is formed in the outer peripheral edge of the partition body member 36, while an internal channel 60 that extends in a substantially helical fashion with a substantially constant cross-sectional shape is formed in the central portion of the partition body member 36. One end of the upper channel 56 and one end of the lower channel 58 are connected together via a through hole 62 provided in the covering member 38, and the other ends of the upper channel 56 and the lower channel 58 are open into the pressure-receiving chamber 52 and the equilibrium chamber 54, respectively, through communication holes 64, 66, whereby a first orifice passage 68 for fluid communication between the pressure-receiving chamber 52 and the equilibrium chamber 54 is formed by means of the upper channel 56 and the lower channel 58 cooperated to each other. One end of the internal channel 60 is open into the pressure-receiving chamber 52 through a communication hole 70 formed in the lower wall portion of the recess 46 of the covering member 38, and the other end portion is open into the equilibrium chamber 54 through a communication hole 72 as an opening portion provided in the partition body member 36, thereby forming a second orifice passage 74 for fluid communication between the pressure-receiving chamber 52 and the equilibrium chamber 54.

An oscillation rubber plate 76 functioning as an elastic oscillation plate is disposed in an axial direction above the recess 44 provided in the partition body member 36. This oscillation rubber plate 76 has a discoid shape, and a metallic ring attachment 78 is bonded to the outer peripheral portion of the oscillation rubber plate 76 in the process of vulcanization of a rubber material to form the oscillation rubber plate 76. The ring attachment 78 is press-fitted into a fixing ring 80 firmly fixed by bonding, welding, or the like around the recess 44 of the partition body member 36, so that the oscillation rubber plate 76 is disposed on and fluid-tightly closes the opening of the recess 44. That is, the recess 44 and the oscillation rubber plate 76 cooperate to define therebetween a first working air chamber 82 functioning as a working air chamber formed between the opposing faces of the recess 44 and the oscillation rubber plate 76. In other words, the oscillation rubber plate 76 partially defines the pressure-receiving chamber 52 and a pressure of the fluid in the pressure-receiving chamber 52 is applied to one face of the oscillation rubber plate 76. The first working air chamber 82 is open to the external area through a first air passage 84 open in the bottom portion of the recess 44. A first air conduit 88 is connectable to a first port 86 formed in the outer opening portion of this first air passage 84, whereby the first working air chamber 82 is connectable to the atmosphere and a vacuum source 90 through the first air conduit 88. Specifically, a first pressure control valve 92 is connected to a portion on the first air conduit 88 connected to the first working air chamber 82. This first pressure control valve 92 has two operating positions one of which permits a communication of the first working air chamber 82 with the atmosphere, and the other of which permits a communication of the first working air chamber 82 with the vacuum source 90. The first pressure control valve 92 is operated under control of a controller 94 so that the first pressure control valve 92 is alternately switched between the two operating positions. As a result, the first working air chamber 82 is selectively communicated with the vacuum source 90 and the atmosphere. The vacuum source 90 may be a vacuum tank that utilizes negative pressure generated in the air intake portion in the internal-combustion engine of the vehicle, a negative pressure generating pump driven by an internal combustion engine, or the like.

An orifice member 96 made of metal is disposed above the oscillation rubber plate 76. This orifice member 96 is a thin annular plate shaped member having a central hole 98. The orifice member 96 is coaxially or concentrically superimposed over the fixing ring 80, and is firmly fixed to the fixing ring 80 by bonding, welding, or the like. The orifice member 96 divides the pressure-receiving chamber 52 into a primary fluid chamber 100 located on the axially upper side thereof and partially defined by the elastic body 16, and an auxiliary fluid chamber 102 located on the axially lower side thereof and partially defined by the oscillation rubber plate 76. The central hole 98 serves as a third orifice passage 104 for fluid communication between the primary fluid chamber 100 and the auxiliary fluid chamber 102.

The engine mount 10 further includes an actuator 106 functioning as a pneumatically operated actuator is positioned beneath and attached to the second mounting member 14. This actuator 106 includes a securing attachment 112 made of metal and an outer wall member 108, and an elastic rubber wall 110. The securing attachment 112 has a hollow cylindrical shape in its entirety, and includes a securing portion 109 integrally formed at its axially upper end portion in an outward annular flange shape, and a support portion 111 integrally formed at its axially lower end portion in an inward annular flange shape. On the other hand, the elastic rubber wall 110 has an annular shape in its entirety, and a pushing member 118 having an inverted cup shape is located in a central hole of the elastic rubber wall 110. Upon vulcanization of a rubber material to form the elastic rubber wall 110, an inner peripheral portion of the elastic rubber wall 110 is bonded to the circumferential portion of the open end of the pushing member 118, and an outer peripheral portion of the elastic rubber wall 110 is bonded to an inner peripheral portion of an annular securing sleeve 114 made of metal. A coating rubber integrally formed with the elastic rubber wall 110 is attached across the entire surface of the pushing member 118. The outer wall member 108 is formed with a hard material such as a hard synthetic resin material or metal material and has a discoid shape. After the outer wall member 108 has been inserted and positioned in the securing attachment 112, the outer wall member 108 and the elastic rubber wall 110 are securely affixed to the securing attachment 112 by a securing sleeve 114 press-fitted into the cylinder wall portion of the securing attachment 112. The outer peripheral portion of the outer wall member 108 and the outer peripheral portion of the elastic rubber wall 110 are fluid-tightly press-bonded under conditions where the outer wall member 108 and the elastic rubber wall 110 are affixed to the securing attachment 112 in this manner, whereby a hermetically sealed second working air chamber 116 is formed by and between the opposing faces of the outer wall member 108 and the pushing member 118. The actuator 106 thus constructed is attached to the engine mount 10 by the securing attachment 112 being superimposed over and bolted to the supporting attachment 32. In this fixed condition, a top wall of the pushing member 118 is opposed to the opening (communication hole 72) of the second orifice passage located in the central portion of the lower surface of the partition member 34 with the diaphragm 30 interposed therebetween. The securing attachment 112 is mounted on a member on the body side by a bolt that is inserted into the bolt insertion hole (not shown) provided in the securing portion 109, so that the second mounting member 14 is mounted on the member on the body side.

A coil spring 120 functioning as a biasing member is housed in the central portion of the second working air chamber 116 and is disposed between the opposing faces of the outer wall member 108 and the pushing member 118. In this arrangement, the coil spring 120 always biases the pushing member 118 in the axially upward direction in which the pushing member 118 is away from the outer wall member 108.

A central protruding portion 122 of a substantially inverted cup shape is integrally formed in the center portion of the outer wall member 108 so as to protrude into the second working air chamber 116. A second port 124 is integrally formed in this central protruding portion 122 such that the second port 124 protrudes outwardly from the inner surface of the central protruding portion 122. A second air conduit 126 is connectable to this second port 124, whereby the second working air chamber 116 is connectable to the atmosphere and vacuum source 90 through this second air conduit 126. Specifically, a second pressure control valve 128 is connected to a portion on the second air conduit 126 connected to the second working air chamber 116. The second pressure control valve 128 has two operating positions one of which permits a communication of the second working air chamber 116 with the atmosphere, and the other of which permits a communication of the second working air chamber 116 with the vacuum source 90. The second pressure control valve 128 is operated under control of a controller 94 so that the second pressure control valve 128 is alternately switched between the two operating positions. As a result, the second working air chamber 116 is selectively communicated with the vacuum source 90 and the atmosphere.

In operation, when the second working air chamber 116 is connected to the atmosphere, the pushing member 118 is displaced axially upward and held in its protruding position with the help of the biasing force generated by the coil spring 120. When the second working air chamber 116 is connected to the vacuum source 90, on the other hand, the pushing member 118 is displaced axially downward and held in its retracted position (on the side of the outer wall member 108) against the biasing force of the coil spring 120. A cushioning stopper rubber 130 is formed in the lower surface of the top wall portion of the pushing member 118 so as to protrude toward the central protruding portion 122. The cushioning stopper rubber 130 is brought into abutting contact with the central protruding portion 122 in a cushioning fashion, when the pushing member 118 is retracted by the vacuum or negative pressure applied to the second working air chamber 116, thereby limiting an amount of displacement of the pushing member 118 in the axially downward direction in which the pushing member 118 is retracted by the vacuum.

Figure 3:
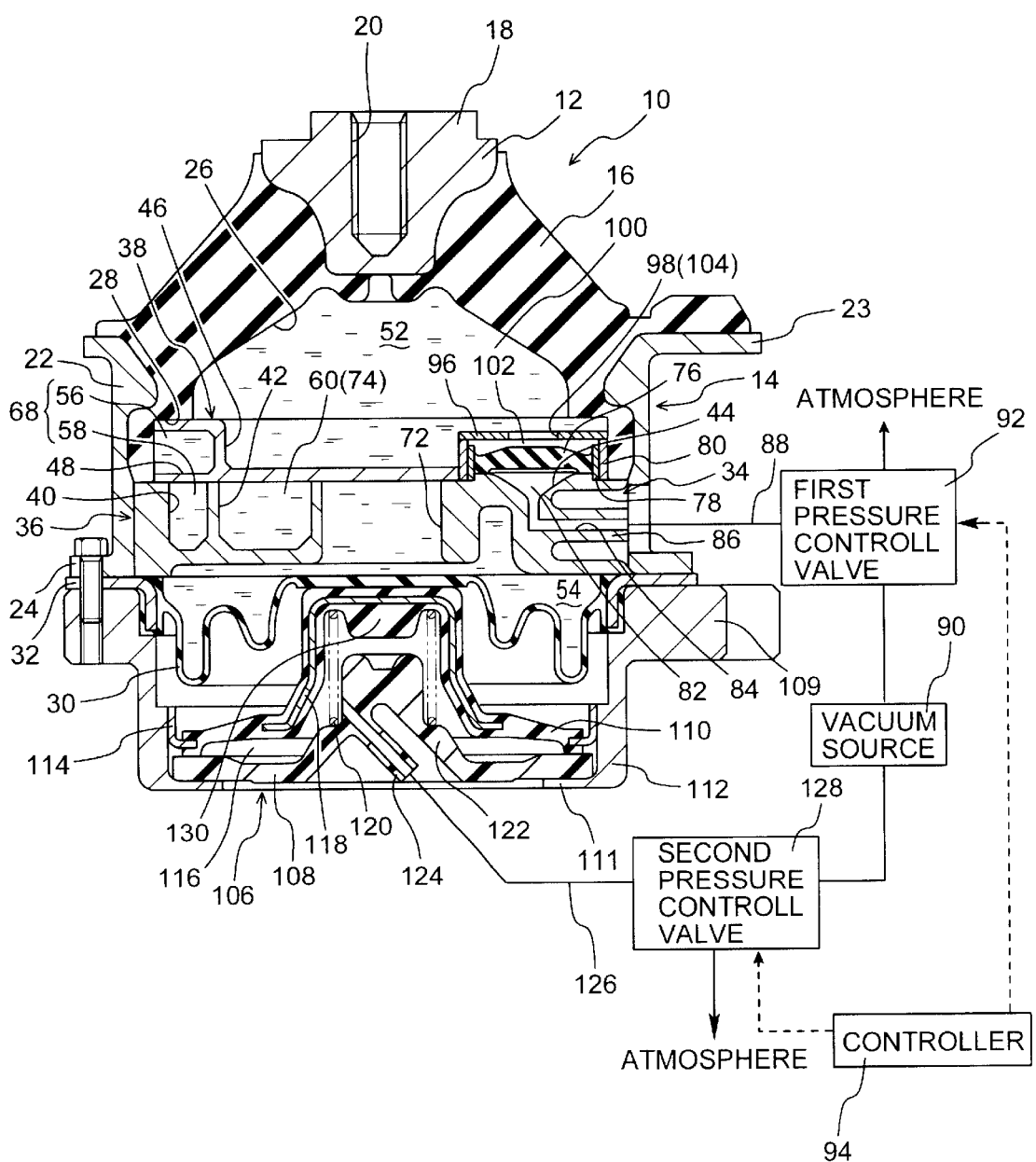
FIG. 3 is an elevational view in axial or vertical cross section of the engine mount of FIG. 1, showing one operating mode of the engine mount.

In a state where the atmospheric pressure is applied to the second working air chamber 116, as shown in FIG. 1, the pushing member 118 is biased upwardly by the coil spring 120 and pushes the central portion of the diaphragm 30 onto the lower surface of the partition member 40. More specifically, the diaphragm 30 is forcedly held in close contact with the periphery of the opening of the second orifice passage 74 on the side of the equilibrium chamber 54 (communication hole 72), as seen in FIG. 1. In this condition, the opening of the second orifice passage 74 is fluid-tightly closed by the diaphragm 30 thereby prohibiting flows of the fluid through the second orifice passage 74. When the vacuum is applied to the second working air chamber 116, as shown in FIG. 3, the pressure in the working air chamber 116 is reduced below the atmospheric pressure, and the pushing member 118 is retracted away from the partition member 34 against the biasing force of the coil spring 120. Accordingly, the diaphragm 30 is spaced away from the lower surface of the partition member 34, whereby the communication hole 72 is open to the equilibrium chamber 54, so that the second orifice passage 74 is held in fluid communication with the equilibrium chamber 54. As is understood from the aforementioned description, the diaphragm 30 and the actuator 106 cooperate to function as a shut-off (opening and closing) valve mechanism in the present embodiment.

Thus, the engine mount 10 of the present embodiment is capable of changing its damping characteristics by suitably controlling the pressure of the air applied to the first working air chamber 82 and the second working air chamber 116, whereby an effective vibration-damping effect can be achieved for several vibration frequency ranges. The following is a description of a specific example of a method of operating and controlling the engine mount 10 of the present embodiment. (1) An example of an effective operation control method will be described as a first example for a case in which tuning is done so that an effective vibration-damping can be achieved with the first orifice passage 68 for engine shakes, the second orifice passage 74 for idling vibrations, the third orifice passage 104 for booming noises produced during running of the vehicle, or the like; and (2) another example of an effective operation control method will be described as a second example for a case in which tuning is done so that the first orifice passage 68 functions as a restrictive passage in order to release an abrupt pressure raise or an impact pressure and/or the static pressure caused by the engine weight or the like in the pressure-receiving chamber 52, and tuning is done so that an effective vibration-damping effect can be achieved with the second orifice passage 74 for engine shakes and the third orifice passage 104 for idling vibrations.

Case (1)

While the automotive vehicle is running, the second working air chamber 116 is connected to the atmosphere by the second pressure control valve 128, the second orifice passage 74 is brought to an inoperative or a closed state where flows of the fluid through the second orifice passage 74 is prohibited, and the switching operation of the first pressure control valve 92 is controlled at a frequency and phase corresponding to those of the running booing noise to be damped.

Upon application of a low frequency vibrational load to the engine mount 10, during running of the vehicle, internal pressure variation in the pressure-receiving chamber 52 is induced, thus causing flows of the fluid through the first orifice passage 68 between the pressure-receiving chamber 52 and the equilibrium chamber 54 on the basis of the relative internal pressure difference between the two chambers 52 and 54. As a result, the engine mount 10 can exhibit a passive vibration-damping effect with respect to the engine shakes or the like on the basis of the resonance or flows of the fluid through the first orifice passage 68.

When the first working air chamber 82 is alternately connected to the atmosphere and the vacuum source 90 as a result of the above-described controlled switching operation of the first pressure control valve 92, a periodic air pressure change whose frequency corresponds to that of the booming noises is generated in the first working air chamber 82, causing oscillation of the oscillation rubber plate 76. The oscillation of the oscillating rubber plate 76 actively induces internal pressure variation in the auxiliary fluid chamber 102, which is transmitted to the primary fluid chamber 100 through the third orifice passage 104. As a result, an active vibration-damping effect can be effectively achieved for booming noises or the like on the basis of the active pressure control of the primary fluid chamber 100 as described above. As is understood from the foregoing description, the engine mount 10 according to the case 1, can exhibit excellent vibration-damping capability with respect to both of the engine shakes or other low frequency vibrations and the booming noises or other high frequency vibrations, simultaneously, during running of the vehicle.

While the vehicle is idling, on the other hand, the second working air chamber 116 is connected to the vacuum source 90 by the second pressure control valve 128, whereby the second orifice passage 74 is brought to an operable state where fluid flows through the second orifice passage 74 is permitted, and the switching operation of the first pressure control valve 92 is controlled at a frequency and phase corresponding to those of the intermediate frequency vibrations such as an engine idling vibration.

Upon application of the intermediate frequency vibrations such as engine idling vibrations, during idling of the vehicle, internal pressure variation in the pressure-receiving chamber 52 is induced, thus causing flows of the fluid through the second orifice passage 74 between the pressure-receiving chamber 52 and the equilibrium chamber 54 on the basis of the relative internal pressure difference between the two chambers 52 and 54. As a result, the engine mount 10 can exhibit a passive vibration-damping effect with respect to the engine idling vibrations or the like on the basis of the resonance of the fluid through the second orifice passage 74.

When the first working air chamber 82 is alternately connected to the atmosphere and the vacuum source 90 as a result of the above described controlled switching operation of the first pressure control valve 92, a periodic air pressure change whose frequency corresponds to that of the engine idling vibration is generated in the first working air chamber 82, causing oscillation of the oscillation rubber plate 76. The oscillation of the oscillating rubber plate 76 actively induces internal pressure variation in the auxiliary fluid chamber 102, which is transmitted to the primary fluid chamber 100 through the third orifice passage 104. As a result, an active vibration-damping effect can be effectively achieved for engine idling vibrations or the like on the basis of the active pressure control of the primary fluid chamber 100 as described above. As is understood from the foregoing description, the engine mount 10 according to the case (1) is capable of exhibiting not only a passive vibration-damping effect on the basis of the resonance of the flows through the second orifice passage 74, but also an active vibration-damping effect on the basis of the active oscillation of the oscillation rubber plate 76, with respect to the engine idling vibrations, whereby improvements in the vibration-damping capability of the engine mount 10 for idling vibrations can be made extremely efficiently.

Consequently, the engine mount 10 constructed according to the first example is capable of exhibiting an excellent vibration-damping effect with respect to low frequency vibrations such as engine shakes, intermediate frequency vibrations such as idling vibrations, and high frequency vibrations such as booming noises. Also, during running of the vehicle, the engine mount 10 can exhibit excellent vibration-damping effect with respect to both of the engine shakes or other low frequency vibrations and the booming noises or other high frequency vibrations, simultaneously.

Case (2)

While the vehicle is idling, the second working air chamber 116 is connected to the atmosphere by the second pressure control valve 128 so that the second orifice passage 74 is brought to the closed state, while the switching operation of the first pressure control valve 92 is controlled at a frequency and phase corresponding to those of intermediate frequency vibrations such as engine idling vibrations.

When the first working air chamber 82 is alternately connected to the atmosphere and the vacuum source 90 as a result of the above described controlled switching operation of the first pressure control valve 92, a periodic air pressure change whose frequency corresponds to that of the engine idling vibrations is generated in the first working air chamber 82, causing oscillation of the oscillation rubber plate 76. The oscillation of the oscillating rubber plate 76 actively induces internal pressure variation in the auxiliary fluid chamber 102, which is effectively transmitted to the primary fluid chamber 100 with the help of resonance of the fluid flowing through the third orifice passage 104. Thus, the engine mount 100 can exhibit an active vibration damping effect with respect to the engine idling vibrations in an effective manner.

While the vehicle is running, on the other hand, the second working air chamber 116 is connected to the vacuum source 90 by the second pressure control valve 128 so that the second orifice passage 74 is brought to the operable state, and the switching operation of the first pressure control valve 92 is controlled at a frequency and phase corresponding to those of the booming noises.

Upon application of low frequency vibrations, such as engine shakes to the engine mount 10, during running of the vehicle, internal pressure variation in the pressure-receiving chamber 52 is induced, thus causing flows of the fluid through the second orifice passage 74 between the pressure-receiving chamber 52 and the equilibrium chamber 54 on the basis of the relative internal pressure difference between the two chambers 52 and 54. As a result, the engine mount 10 can exhibit a passive vibration-damping effect with respect to the engine shakes or the like on the basis of the resonance or flows of the fluid through the second orifice passage 74.

When the first working air chamber 82 is alternately connected to the atmosphere and the vacuum source 90 as a result of the above-described controlled switching operation of the first pressure control valve 92, a periodic air pressure change whose frequency corresponds to that of the booming noises is generated in the first working air chamber 82, causing oscillation of the oscillation rubber plate 76. The oscillation of the oscillating rubber plate 76 actively induces internal pressure variation in the auxiliary fluid chamber 102, which is transmitted to the primary fluid chamber 100 through the third orifice passage 104. As a result, an active vibration-damping effect can be effectively achieved for booming noises or the like on the basis of the active pressure control of the primary fluid chamber 100 as described above. As is understood from the foregoing description, the engine mount 10 according to the case (2), can exhibit excellent vibration damping capability with respect to both of the engine shakes or other low frequency vibrations and the booming noises or other high frequency vibrations, simultaneously, during running of the vehicle.

As to the case (2), it is possible to efficiently prevent transmission of excessive force based on the impact pressure generated in the pressure-receiving chamber 52 (primary fluid chamber 100) or damage to the elastic body 16. This can be achieved because the first orifice passage 68 is tuned to release impact pressure or static pressure due to engine weight generated in the pressure-receiving chamber 52 (primary fluid chamber 100) while the vehicle is idling.

The pressure in the first working air chamber 82 and the second working air chamber 116 can be efficiently controlled in both cases (1) and (2) by a method in which the running condition of the vehicle is monitored based, for example, on an accelerator opening signal, a vehicle speed signal, or a shift position of the vehicle, and feedback control (such as adaptive control) or alternatively mapping control is performed in a mode that corresponds to the running condition of the vehicle in which with an ignition signal of the internal combustion engine or the like is used as a reference signal.

The engine mount 10 according to the present embodiment is able to efficiently secure the passage length of the first orifice passage 68, since the first orifice passage 68 is formed in the outer peripheral portion of the partition member 34, making it possible to achieve greater tuning latitude for the first orifice passage 68.

The use of the pneumatically operated actuator 106 that allows the second orifice passage 74 to be closed or connected permits the engine mount 10 to have a simple structure, and permits the first orifice passage 68 to have a reduced flow resistance relatively by closing the second orifice passage 74 when vibrations in the tuning frequency range of the first orifice passage 68 is applied to the engine mount 10. This makes it possible to assure a sufficient amount of flows of the fluid through the first orifice passage 68, whereby a vibration-damping effect can be effectively achieved based on the resonance effect and other types of flow effect displayed by the fluid allowed to flow through the first orifice passage 68.

Figure 4:
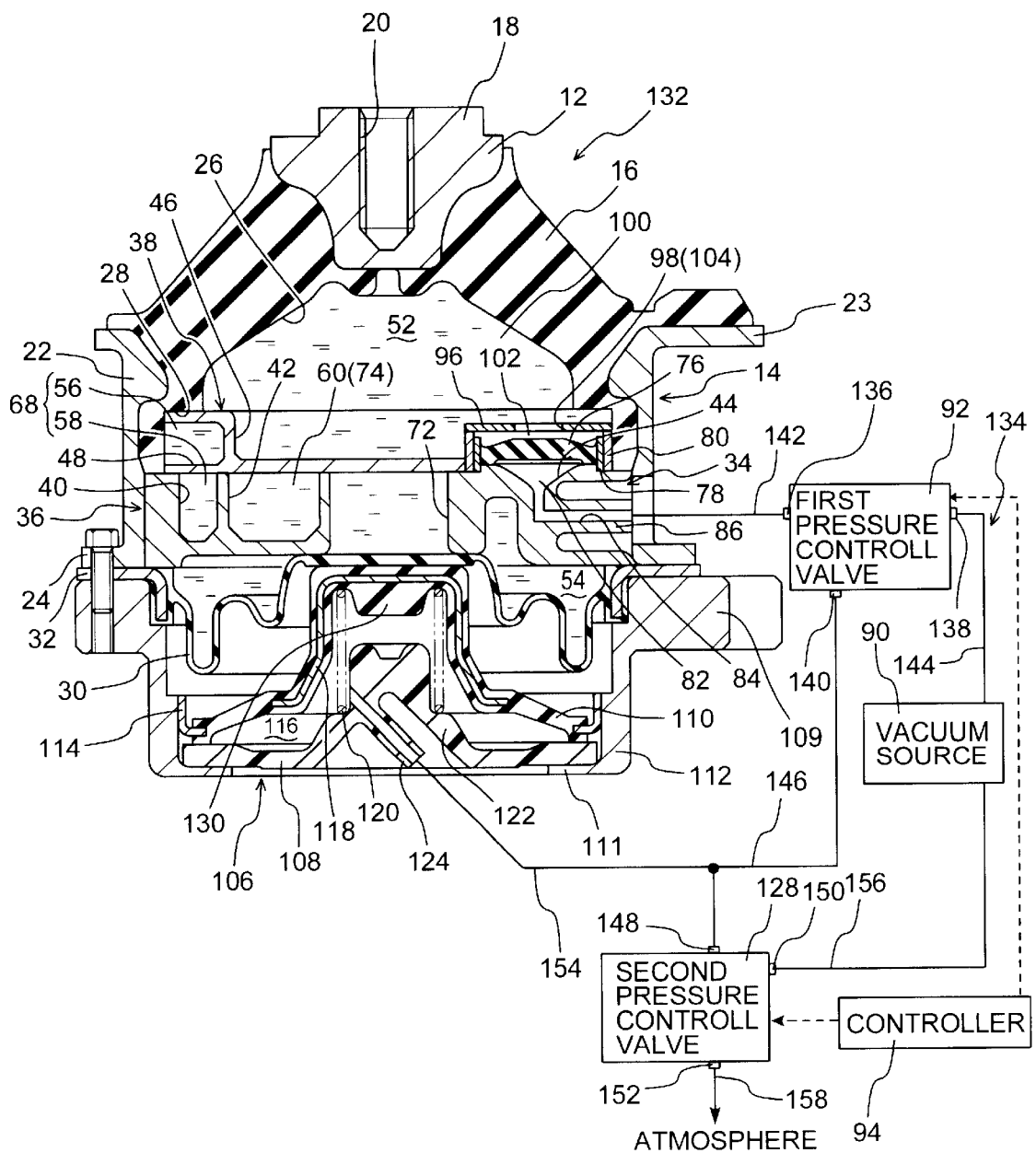
FIG. 4 is an elevational view in axial or vertical cross section of an engine mount constructed according to a second embodiment of the invention.

Referring next to FIG. 4, an engine mount 132 is shown as a second embodiment of a fluid-filled vibration-damping device of the present invention. In this engine mount 132, the structure of an air conduit 134 that causes air pressure in the first working air chamber 82 and the second working air chamber 116 differs in comparison to the engine mount (10)

of the first embodiment. The same reference numerals as used for the engine mount 10 shown in FIGS. 1–3 are used to designate the corresponding elements and parts of the engine mount 132 according to the second embodiments, and the detailed description thereof is omitted.

More specifically, the air conduit 134 of the present embodiment comprises a first pressure control valve 92 and a second pressure control valve 128. Negative pressure and atmospheric pressure are selectively applied through the first pressure control valve 92 to the first working air chamber 82, and are selectively applied through the second pressure control valve 128 to the second working air chamber 116.

The first pressure control valve 92 comprises a first port 136 functioning as an active-side port, a second port 138 functioning as a vacuum-side port, and a third port 140 functioning as an atmosphere-side port. The first port 136 is connected to the first working air chamber 82 through an output air conduit 142, the second port 138 is connected to the vacuum source 90 through a negative introduction conduit 144, and the third port 140 is connected to the second pressure control valve 128 through an air pressure introduction conduit 146.

The second pressure control valve 128 includes a first port 148 functioning as an active-side port, a second port 150 functioning as a vacuum-side port, and a third port 152 functioning as an atmosphere-side port. The first port 148 is connected to the second working air chamber 166 through an output air conduit 154, the second port 150 is connected to the vacuum source 90 through a vacuum introduction conduit 156, and the third port 152 is connected to the atmosphere through an atmospheric pressure introduction conduit 158. The air pressure introduction conduit 146 that is connected to the third port 140 of the first pressure control valve 92 is also connected to the output air conduit 154 connected to the first port 148 of the second pressure control valve 128, whereby the air pressure reaching the output air conduit 154 connected to the second pressure control valve 128 is also applied to the third port 140 of the first pressure control valve 92 through the air pressure introduction conduit 146.

The first and second pressure control valves 92, 128 are required to be operable to connect the first ports 136, 148 alternately to the second ports 138, 150 and the third ports 140, 152. For the first pressure control valve 92, particularly, an electromagnetic switching valve actuated by the electric current through a solenoid may preferably adopted, for example, so that the first pressure control valve 92 can be switched at a relatively high speed between the second and third ports 138, 150. In the present embodiment, the first pressure control valve 92 may preferably be arranged to be connected to the third port 140 during the non-energized state thereof. This makes it possible to induce air pressure variation in the first and second working air chambers 82, 116 by simply switching the first port 148 of the second pressure control valve 128 to alternately connect the first port 148 to the second and third ports 150, 152, while the first pressure control valve 92 being held in its non-energized state.

A description will now be given regarding a specific example of the operation control method of the engine mount 132 thus constructed. In the present embodiment, tuning has been done so that an excellent vibration-damping effect is achieved with the first orifice passage 68 for engine shakes, with the second orifice passage 74 for engine idling vibrations, and with the third orifice passage 104 for booming noises.

While the vehicle is running, the second working air chamber 116 is connected to the atmosphere through the output air conduit 154 by connecting the first port 148 of the second pressure control valve 128 to the third port 152, whereby the second orifice passage 74 is brought to a closed state where fluid flows through the second orifice passage 74 is prohibited. The first pressure control valve 92 is switched to alternately connect the first port 136 to the second and third ports 138, 140 at a frequency and phase corresponding to those of the booming noises.

Upon application of low frequency vibrations, such as engine shakes to the engine mount 132, during running of the vehicle, internal pressure variation in the pressure-receiving chamber 52 is induced, thus causing flows of the fluid through the first orifice passage 68 between the pressure-receiving chamber 52 and the equilibrium chamber 54 on the basis of the relative internal pressure difference between the two chambers 52 and 54. As a result, the engine mount 132 can exhibit a passive vibration-damping effect with respect to the engine shakes or the like on the basis of the resonance of the fluid through the first orifice passage 68.

Alternate connection of the first port 136 of the first pressure control valve 92 to the second and third ports 138, 140 can provide alternately two operating conditions, i.e., a negative pressure applied condition whereby the first working air chamber 82 is connected to the vacuum source 90 through the output air conduit 142, the first pressure control valve 92, and the negative pressure introduction conduit 144, and a atmospheric pressure applied condition whereby the first working air chamber 82 is connected to the atmosphere through the output air conduit 142, the first pressure control valve 92, the air pressure introduction conduit 146, part of the output air conduit 154, the second pressure control valve 128, and the atmospheric pressure introduction conduit 158. Consequently, periodic air pressure changes at a frequency corresponding to the frequency of the booming noises are thereby allowed to reach the first working air chamber 82, whereby the oscillation rubber plate 76 is caused to oscillate, thus actively inducing internal pressure variation in the auxiliary fluid chamber 102. The internal pressure variation thus actively caused in the auxiliary fluid chamber 102 is effectively transmitted to the primary fluid chamber 100 through the third orifice passage 104. Thus, an effective vibration damping based on active pressure control of the primary fluid chamber 100 is effectively achieved for the booming noises or the like. As is understood from the above description, the engine mount 132 can exhibit an effective vibration-damping capability for engine shakes or low frequency vibrations and booming noise or higher frequency while the vehicle is running.

While the vehicle is idling, on the other hand, the second working air chamber 116 is connected to the vacuum source 90, and the second orifice passage 74 is brought to an operable state where the fluid flows through the second orifice passage is permitted, as a result of connection of the first port 148 of the second pressure control valve 128 to the second port 150. Also, the first working air chamber 82 is connected to the vacuum source 90 through the output air conduit 142, the first pressure control valve 92, the air pressure introduction conduit 146, part of the output air conduit 154, the second pressure control valve 128, and the negative pressure introduction conduit 156, as a result of connection of the first port 136 of the first pressure control valve 92 to the third port 140. Negative pressure is thereby allowed to reach the first working air chamber 82, and the oscillation rubber plate 76 that forms one part of the wall portion of the first working air chamber 82 is held in a state of vacuum suction.

Upon application of the intermediate frequency vibrations such as engine idling vibrations, during idling of the vehicle, internal pressure variation in the pressure-receiving chamber 52 is induced, thus causing flows of the fluid through the second orifice passage 74 between the pressure-receiving chamber 52 and the equilibrium chamber 54 on the basis of the relative internal pressure difference between the two chambers 52 and 54. As a result, the engine mount 10 can exhibit a passive vibration-damping effect with respect to the engine idling vibrations or the like on the basis of the resonance of the fluid through the second orifice passage 74.

The present embodiment makes it possible to hold the oscillation rubber plate 76 in the state of vacuum suction because the first working air chamber 82 is connected to the vacuum source 90, thus allowing the oscillation rubber plate 76 to acquire stiffer spring characteristics. Absorption of the internal pressure changes by the elastic deformation or elastic displacement of the oscillation rubber plate 76 can therefore be restricted or prevented when these changes are induced in the pressure-receiving chamber 52, thus assuring a sufficient amount of fluid flowing through the second orifice passage 74. The engine mount 132 can exhibit a passive vibration-damping effect on the basis of resonance of the fluid flowing through the second orifice passage 74 in a further effective manner.

Like the engine mount (10) of the first embodiment, the engine mount 132 constructed as described above is capable of exhibiting excellent vibration-damping effect with respect to low frequency vibrations like engine shakes, intermediate frequency vibrations like engine idling vibrations and high frequency vibrations like booming noises. In particular, a vibration isolation effect can simultaneously be achieved for vibrations of differing frequency ranges such as low frequency engine shakes and high frequency booming noises, during running of the vehicle.

In the present embodiment, the air pressure introduction conduit 146 connected to the third port 140 of the first pressure control valve 92 is also connected to the output air conduit 154 itself connected to the first port 148 of the second pressure control valve 128, making it possible to allow negative pressure and atmospheric pressure to reach the first and second working air chambers 82, 116, alternatively, by simply switching the second pressure control valve 128 to connect the first port 148 to the second and third ports 150, 152 in the case where the first port 136 of the first pressure control valve 92 is connected to the third port 140. Therefore the second pressure control valve 128 alone needs to be controlled by the controller 94 when the vehicle is idling, thus simplify the operation and control of the engine mount 132.

Figure 5:
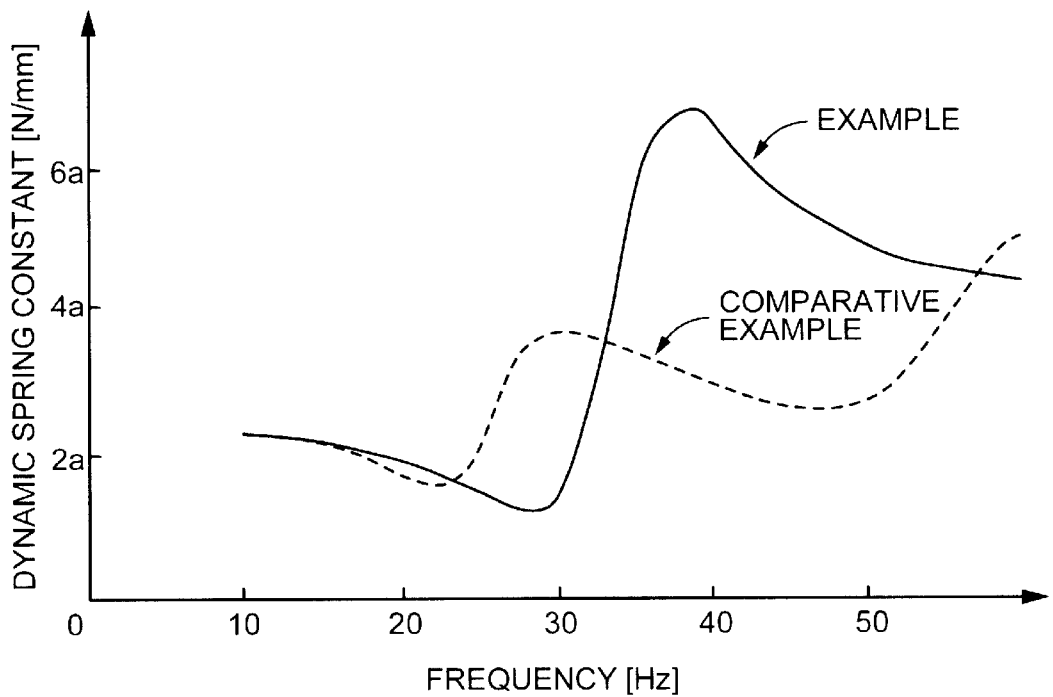
FIG. 5 is a graph showing a frequency dependence of the dynamic spring characteristics of the engine mount of FIG. 4, as measured when an automotive vehicle is in an idling state.

FIG. 5 shows the results of measuring the frequency dependence of the dynamic spring characteristics of the engine mount 132 under conditions in which negative pressure was applied to the first and second working air chambers 82, 116 of the engine mount 132 thus configured by way of example. Also shown in FIG. 5 as a comparison are the results of measuring the frequency dependence of the dynamic spring characteristics of the engine mount (10) under conditions in which atmospheric pressure was caused to reach the first working air chamber (82) of the engine mount (10) in accordance with the first embodiment, and negative pressure was allowed to reach the second working air chamber (116).

In the engine mount 132 constructed according to the present embodiment, a negative pressure is applied to the first working air chamber 82 and the oscillation rubber plate 76 acquires stiffer spring characteristics, making it possible to restrict or prevent absorption of the internal pressure changes in the pressure-receiving chamber 52 based on the elastic deformation or elastic displacement of the oscillation rubber plate 76. It is thus confirmed as for the engine mount 132 that the bottom peak value of the dynamic spring constant is reduced in comparison with the comparative example and that the vibration isolation performance at about 30 Hz can be improved compared to the comparison example.

While the present invention has been described in its presently preferred embodiments, it is to be understood that the invention is not limited to the details of the illustrated embodiment, but may be otherwise modified.

For instance, the tuning frequencies of the first orifice passage 68, the second orifice passage 74, and the third orifice passage 104 are appropriately determined and changed according to the vibration frequencies to be damped or isolated, and are not particularly limited to those of the illustrated first or second embodiments. Also, the third orifice passage 104 is provided in the illustrated first and second embodiments, but the third orifice passage 104 is not essential to practice the present invention. Furthermore, the first orifice passage 68 and second orifice passage 74 were provided in a parallel fashion between the pressure-receiving chamber 52 and the equilibrium chamber 54 in the first and second embodiments, but the first orifice passage and second orifice passage may be provided in a linear fashion between the pressure-receiving chamber and the equilibrium chamber.

In case (1) in the illustrated first embodiment, the oscillation rubber plate 76 is set for oscillation at a frequency corresponding to that of engine idling vibrations with the second orifice passage 74 being held in its operable state. However, the elastic oscillation rubber plate 76 needs not to be always oscillated when the second orifice passage 74 is held in its open state. Further, the oscillation of the oscillation rubber plate 76 may be appropriately determined or changed according to the vibration frequency to be damped or isolated, and is not limited to that of the illustrated first and second embodiments.

It may otherwise be possible that the first mounting member is a hollow structure, and the working air chamber and auxiliary fluid chamber are formed in the interior of the first mounting member by disposing the elastic oscillation plate in the hollow portion of the first mounting member. A communication hole provided for a fluid communication between the auxiliary fluid chamber and primary fluid chamber may be formed in the first mounting member, as well. In this arrangement, the third orifice passage is formed by the communication hole provided to the first mounting member. Alternatively, the third orifice passage may be composed of an orifice member disposed inside the first mounting member.

Various kinds of shut-off valves such as a rotary valve that uses an electric motor, an electromagnetic actuator, or the like may be adoptable as a shut-off valve mechanism in addition to the air pressurized shut-off valve 106 as illustrated. The present invention also allows a valve member (shut-off valve) to be mounted and unitized inside the partition member.

In the illustrated first and second embodiments, the diaphragm 30 and the elastic rubber wall 110 were not connected together, but it is possible to connect them by bonding or the like. It is also apparent that the diaphragm 30 and the elastic rubber wall 110 can be integrally formed.

As to the illustrated second embodiment, negative pressure is applied simultaneously in the actuator 106 and the first working air chamber 82 by suitably controlling the switching operation of the second pressure control valve 128 alone, but negative pressure may also be applied to the actuator 106 and the first working air chamber 82 by controlling the switching operation of the first pressure control valve 92 and the second pressure control valve 128 of the engine mount 10 of the illustrated embodiment in a synchronous manner.

In the case where a plurality of engine mounts 132 of the second embodiment are adopted, it is desirable that the plurality of engine mounts 132 share the second pressure control valve 128 for controllably connecting and closing the second orifice passage 74 by selectively causing atmospheric pressure and negative pressure to reach the second working air chamber 116. In this arrangement, the control of the common second pressure control valve 128 shared by the plurality of engine mount 132 is simply required to induce the air pressure variation in the first working air chamber 82 while simultaneously controlling connection/disconnection of the second orifice passage 74 of each engine mount. Also, this arrangement permits a simple control of operations of the plurality of engine mount 132 during idling of the vehicle, particularly.

While the illustrated first and second embodiments of the fluid-filled vibration-damping device of the present invention take the form of the engine mounts for an automotive vehicle, for the illustrative purpose only, the principle of the present invention is equally applicable to engine mounts of various type, various other types of engine mount such as a cylindrical fluid-filled engine mount for FF (front-engine front-drive) vehicles as disclosed in JP-A-10-184770, a body mount and a differential mount for use on a motor vehicle, and other fluid-filled vibration-damping devices for use in various devices other than those for the automotive vehicle.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration-damping device for connecting two members in a vibration damping fashion, comprising:
    a first mounting member and a second mounting member disposed in a mutually spaced-apart relationship with each other and adapted to be attached to the two members, respectively;
    an elastic body elastically connecting said first and second mounting members, and partially defining a pressure-receiving chamber filled with a non-compressible fluid whose pressure varies upon application of a vibrational load to said pressure-receiving chamber;
    a flexible diaphragm partially defining an equilibrium chamber filled with said non-compressible fluid and whose volume is variable;
    a first orifice passage for fluid communication between said pressure-receiving chamber and said equilibrium chamber;
    a second orifice passage for fluid communication between said pressure-receiving chamber and said equilibrium chamber, said second orifice passage being tuned to a frequency range that is higher than a frequency range to which said first orifice passage is tuned;
    a shut-off valve mechanism operable to selectively bring said second orifice passage to an operable state and an inoperable state, while permitting said first orifice passage to be held in an operable state;
    an elastic oscillation plate partially defining said pressure-receiving chamber so that a fluid pressure in said pressure-receiving chamber acts on one of opposite surfaces of said elastic oscillation plate; and
    a working air chamber partially defined by an other one of opposite surfaces of said elastic oscillation plate, which is remote from said pressure-receiving chamber, said elastic oscillation plate being oscillated by a periodic change of an air pressure in said working air chamber.

2. A fluid-filled vibration-damping device according to claim 1, wherein one of opposite openings of said second orifice passage for fluid communication with said equilibrium chamber is located in a position that is different from a position where one of opposite openings of said first orifice passage for fluid communication with said equilibrium chamber is located, said vibration-damping device further comprising a pneumatically operated actuator disposed to be opposed to said one of opposite openings of said second orifice passage with said flexible diaphragm interposed therebetween, said pneumatically operated actuator being operable to displace said flexible diaphragm to selectively be pressed onto and retracted from said one of opposite openings of said second orifice passage, in order to selectively bring said second orifice passage to said operable state and said inoperable state.

3. A fluid-filled vibration-damping device according to claim 1, wherein said pressure-receiving chamber is divided into a primary fluid chamber partially defined by said elastic body and an auxiliary fluid chamber partially defined by said elastic oscillation plate, said vibration-damping device further comprising a third orifice passage for fluid communication between said primary fluid chamber and said auxiliary fluid chamber, which is tuned to a frequency range higher than said frequency range to which said second orifice passage is tuned.

4. A fluid-filled vibration-damping device according to claim 3, wherein said vibration-damping device is applied to an engine mount for use in an automotive vehicle, and said first, second and third orifice passages are respectively tuned to a low frequency range corresponding to engine shakes, an intermediate frequency range corresponding to engine idling vibrations, and a high frequency vibrations corresponding to booming noises.

5. A fluid-filled vibration-damping device according to claim 3, wherein said vibration-damping device is applied to an engine mount for use in an automotive vehicle, said first orifice passage is adapted to release an abrupt pressure raise and/or a static load, and said second and third orifice passages are respectively tuned to a low frequency range corresponding to engine shakes and an intermediate frequency range corresponding to engine idling vibrations.

6. A fluid-filled vibration-damping device according to claim 1, wherein said second mounting member includes a cylindrical portion and one of axially opposite opening of said cylindrical portion is opposed to said first mounting member with a spacing therebetween, and said elastic body elastically connecting said first and second mounting members fluid-tightly closes said one of axially opposite opening of said cylindrical portion of said second mounting member, while said flexible diaphragm fluid-tightly closes an other one of axially opposite opening of said cylindrical portion of said second mounting member,
    wherein said vibration-damping device further comprises a partition member supported by said cylindrical portion of said second mounting member and being disposed between said elastic body and said flexible diaphragm so that said pressure-receiving chamber and said equilibrium chamber is disposed on opposite sides of said partition member, and wherein said first orifice passage is formed in an outer circumferential portion of said partition member so as to extend circumferentially, and said second orifice passage is formed in a central portion of said partition member, while said elastic oscillation plate is disposed in and supported by a portion of said partition member where said first and second orifice passages are not disposed, such that said portion of said partition member cooperate with said other one of opposite surfaces of said elastic oscillating plate to form said working air chamber.

7. A fluid-filled vibration-damping device according to claim 1, wherein said shut-off valve mechanism comprises a pneumatically operated shut-off valve that is operable to bring said second orifice passage to said inoperable state by an atmospheric pressure applied thereto and to said operable state by a negative pressure applied thereto, said vibration-damping device further comprising:

a first pressure control valve having an active-side port for communication with said working air chamber, an atmosphere-side port for communication with the atmosphere and a vacuum-side port for communication with a vacuum source, and being operable to alternately connect said active-side port to said atmosphere-side port and said vacuum-side port for alternately applying said atmospheric pressure and said negative pressure to said working air chamber, in order to control oscillation of said elastic oscillation plate based on a periodic air pressure change induced in said working air chamber; and a second pressure control valve having an active-side port for communication with said pneumatically operated shut-off valve, an atmosphere-side port for communication with the atmosphere and a vacuum-side port for communication with a vacuum source, and being operable to alternately connect said active-side port to said atmosphere-side port and said vacuum-side port for alternately applying said atmospheric pressure and said negative pressure to said pneumatically operated shut-off valve, in order to selectively bring said second orifice passage to said operable state and said inoperable state, wherein said atmosphere-side port of said first pressure control valve is connected to said active-side port of said second pressure control valve so that said atmospheric pressure is applied to said atmosphere-side port of said first pressure control valve through said second pressure control valve.

8. A method of controlling a fluid-filled vibration-damping device for connecting two members in a vibration-damping fashion, including: (a) a first mounting member and a second mounting member disposed in a mutually spaced-apart relationship with each other and adapted to be attached to the two members, respectively; (b) an elastic body elastically connecting said first and second mounting members, and partially defining a pressure-receiving chamber filled with a non-compressible fluid whose pressure varies upon application of a vibrational load to said pressure-receiving chamber; (c) a flexible diaphragm partially defining an equilibrium chamber filled with said non-compressible fluid and whose volume is variable; (d) a first orifice passage for fluid communication between said pressure-receiving chamber and said equilibrium chamber; (e) a second orifice passage for fluid communication between said pressure-receiving chamber and said equilibrium chamber, said second orifice passage being tuned to a frequency range that is higher than a frequency range to which said first orifice passage is tuned; (f) a shut-off valve mechanism operable to selectively bring said second orifice passage to an operable state and an inoperable state, while permitting said first orifice passage to be held in an operable state; (g) an elastic oscillation plate partially defining said pressure-receiving chamber so that a fluid pressure in said pressure-receiving chamber acts on one of opposite surfaces of said elastic oscillation plate; and (h) a working air chamber partially defined by an other one of opposite surfaces of said elastic oscillation plate, which is remote from said pressure-receiving chamber, said elastic oscillation plate being oscillated by a periodic change of an air pressure in said working air chamber, wherein said pressure-receiving chamber is divided into a primary fluid chamber partially defined by said elastic body and an auxiliary fluid chamber partially defined by said elastic oscillation plate, said vibration-damping device further comprising a third orifice passage for fluid communication between said primary fluid chamber and said auxiliary fluid chamber, which is tuned to a frequency range higher than said frequency range to which said second orifice passage is tuned, and wherein said vibration-damping device is applied to an engine mount for use in an automotive vehicle, and said first, second and third orifice passages are respectively tuned to a low frequency range corresponding to engine shakes, an intermediate frequency range corresponding to engine idling vibrations, and a high frequency vibrations corresponding to booming noises, said method comprising the steps of:

when said vehicle is idling, bringing said second orifice passage to said operable state;

when said vehicle is running, bringing said second orifice passage to said inoperable state by means of said shut-off valve mechanism; and at least when said vehicle is running, applying to said working air chamber a periodic air pressure change at a frequency corresponding to that of vibrations to be damped in order to oscillate said elastic oscillation plate.

9. A method of controlling a fluid-filled vibration-damping device according to claim 8, further comprising the steps of:

when said vehicle is idling, bringing said second orifice passage to said operable state while applying to said working air chamber a periodic air pressure change at a frequency corresponding to that of said engine idling vibrations in order to oscillate said elastic oscillation plate; and when said vehicle is running, bringing said second orifice passage to said inoperable state by means of said shut-off valve mechanism, while applying to said working air chamber a periodic air pressure change at a frequency corresponding to that of said booming noises higher than a frequency of said engine idling vibrations in order to oscillate said elastic oscillation plate in order to oscillate said elastic oscillation plate.

10. A method of controlling a fluid-filled vibration-damping device according to claim 8, further comprising the steps of:

when said vehicle is idling, bringing said second orifice passage to said operable state and applying a negative pressure to said working air chamber; and when said vehicle is running, bringing said second orifice passage to said inoperable state by means of said shut-off valve mechanism, while applying to said working air chamber a periodic air pressure change at a frequency corresponding to that of vibrations to be damped in order to oscillate said elastic oscillation plate.

11. A method of controlling a fluid-filled vibration-damping device according to claim 8, wherein said shut-off valve mechanism includes a pneumatically operated shut-off valve that is operable to bring said second orifice passage to said inoperable state by an atmospheric pressure applied thereto and to said operable state by a negative pressure applied thereto, and said vibration-damping device further includes: (i) a first pressure control valve having an active-side port for communication with said working air chamber, an atmosphere-side port for communication with the atmosphere and a vacuum-side port for communication with a vacuum source, and being operable to alternately connect said active-side port to said atmosphere-side port and said vacuum-side port for alternately applying said atmospheric pressure and said negative pressure to said working air chamber, in order to control oscillation of said elastic oscillation plate based on a periodic air pressure change induced in said working air chamber; and (j) a second pressure control valve having an active-side port for communication with said pneumatically operated shut-off valve, an atmosphere-side port for communication with the atmosphere and a vacuum-side port for communication with a vacuum source, and being operable to alternately connect said active-side port to said atmosphere-side port and said vacuum-side port for alternately applying said atmospheric pressure and said negative pressure to said pneumatically operated shut-off valve, in order to selectively bring said second orifice passage to said operable state and said inoperable state, wherein said atmosphere-side port of said first pressure control valve is connected to said active-side port of said second pressure control valve so that said atmospheric pressure is applied to said atmosphere-side port of said first pressure control valve through said second pressure control valve.

12. A method of controlling a fluid-filled vibration-damping device according to claim 11, further comprising the steps of:

when said vehicle is idling, bringing said second orifice passage to said operable state while applying to said working air chamber a periodic air pressure change at a frequency corresponding to that of said engine idling vibrations in order to oscillate said elastic oscillation plate; and when said vehicle is running, bringing said second orifice passage to said inoperable state by means of said shut-off valve mechanism, while applying to said working air chamber a periodic air pressure change at a frequency corresponding to that of said booming noises higher than said frequency of said engine idling vibrations in order to oscillate said elastic oscillation plate.

13. A method of controlling a fluid-filled vibration-damping device according to claim 11, further comprising the steps of:

when said vehicle is idling, bringing said second orifice passage to said operable state and applying said negative pressure to said working air chamber; and when said vehicle is running, bringing said second orifice passage to said inoperable state by means of said shut-off valve mechanism, while applying to said working air chamber a periodic air pressure change at a frequency corresponding to that of vibrations to be damped in order to oscillate said elastic oscillation plate.

14. A method of controlling a fluid-filled vibration-damping device for connecting two members in a vibration-damping fashion, including: (a) a first mounting member and a second mounting member disposed in a mutually spaced-apart relationship with each other and adapted to be attached to the two members, respectively; (b) an elastic body elastically connecting said first and second mounting members, and partially defining a pressure-receiving chamber filled with a non-compressible fluid whose pressure varies upon application of a vibrational load to said pressure-receiving chamber; (c) a flexible diaphragm partially defining an equilibrium chamber filled with said non-compressible fluid and whose volume is variable; (d) a first orifice passage for fluid communication between said pressure-receiving chamber and said equilibrium chamber; (e) a second orifice passage for fluid communication between said pressure-receiving chamber and said equilibrium chamber, said second orifice passage being tuned to a frequency range that is higher than a frequency range to which said first orifice passage is tuned; (f) a shut-off valve mechanism operable to selectively bring said second orifice passage to an operable state and an inoperable state, while permitting said first orifice passage to be held in an operable state; (g) an elastic oscillation plate partially defining said pressure-receiving chamber so that a fluid pressure in said pressure-receiving chamber acts on one of opposite surfaces of said elastic oscillation plate; and (h) a working air chamber partially defined by an other one of opposite surfaces of said elastic oscillation plate, which is remote from said pressure-receiving chamber, said elastic oscillation plate being oscillated by a periodic change of an air pressure in said working air chamber, wherein said pressure-receiving chamber is divided into a primary fluid chamber partially defined by said elastic body and an auxiliary fluid chamber partially defined by said elastic oscillation plate, said vibration-damping device further comprising a third orifice passage for fluid communication between said primary fluid chamber and said auxiliary fluid chamber, which is tuned to a frequency range higher than said frequency range to which said second orifice passage is tuned, and wherein said vibration-damping device is applied to an engine mount for use in an automotive vehicle, said first orifice passage is adapted to release an abrupt pressure raise and/or a static load, and said second and third orifice passages are respectively tuned to a low frequency range corresponding to engine shakes and an intermediate frequency range corresponding to engine idling vibrations, said method comprising the steps of:

when said vehicle is idling, bringing said second orifice passage to said inoperable state by means of said shut-off valve mechanism, while applying to said working air chamber a periodic air pressure change at a frequency corresponding to that of said engine idling vibrations in order to oscillate said elastic oscillation plate; and when said vehicle is running, bringing said second orifice passage to said operable state and applying said working air chamber a periodic air pressure change at a frequency corresponding to that of booming noises in order to oscillate said elastic oscillation plate.

* * * * *

UNITED STATES PATENT AND TRADEMARK OFFICE
CERTIFICATE OF CORRECTION

PATENT NO. : 6,708,963 B2
DATED : March 23, 2004
INVENTOR(S) : Nishi et al.

It is certified that error appears in the above-identified patent and that said Letters Patent is hereby corrected as shown below:

Title page,
Item [73], Assignee, should read:
-- Tokai Rubber Industries, Ltd. (Komaki, JP);
Honda Giken Kogyo Kabushiki Kaisha, (Tokyo, JP) --

Signed and Sealed this

Tenth Day of August, 2004

JON W. DUDAS
*Acting Director of the United States Patent and Trademark Office*